(12) United States Patent
Kawai et al.

(10) Patent No.: US 9,127,996 B2
(45) Date of Patent: Sep. 8, 2015

(54) SENSOR MODULE, FORCE DETECTING DEVICE, AND ROBOT

(71) Applicant: Seiko Epson Corporation, Tokyo (JP)

(72) Inventors: Hiroki Kawai, Matsumoto (JP); Toshiyuki Kamiya, Fujimi (JP); Takanobu Matsumoto, Minowa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/788,482

(22) Filed: Mar. 7, 2013

(65) Prior Publication Data

US 2013/0233089 A1    Sep. 12, 2013

(30) Foreign Application Priority Data

Mar. 9, 2012    (JP) .................................. 2012-052623

(51) Int. Cl.
*G01L 1/16*    (2006.01)
*B25J 13/08*    (2006.01)
*G01L 5/16*    (2006.01)
*G01L 5/22*    (2006.01)

(52) U.S. Cl.
CPC ................. *G01L 1/16* (2013.01); *B25J 13/085* (2013.01); *G01L 5/167* (2013.01); *G01L 5/226* (2013.01)

(58) Field of Classification Search
CPC ............. G01L 1/16; G01L 1/18; G01L 5/226; G01L 5/167; G01L 1/20
USPC ......................................... 73/862.68; 901/27
See application file for complete search history.

(56) References Cited

U.S. PATENT DOCUMENTS

| 4,802,371 | A | 2/1989 | Calderara et al. |
| 4,821,584 | A | 4/1989 | Lembke |
| 4,993,266 | A * | 2/1991 | Omura et al. .................... 73/720 |
| 5,297,430 | A | 3/1994 | Sonderegger et al. |
| 6,053,051 | A * | 4/2000 | Yamada .................... 73/862.625 |
| 6,373,265 | B1 | 4/2002 | Morimoto et al. |
| 2004/0000195 | A1 * | 1/2004 | Yanai et al. ..................... 73/717 |
| 2005/0199434 | A1 * | 9/2005 | Okada ........................... 180/282 |
| 2006/0144154 | A1 * | 7/2006 | Ueno et al. ....................... 73/723 |
| 2007/0158826 | A1 | 7/2007 | Sakakibara et al. |

(Continued)

FOREIGN PATENT DOCUMENTS

| CN | 202153166 U | 2/2012 | |
| JP | 63142227 A * | 6/1988 | ................ G01L 1/16 |

(Continued)

OTHER PUBLICATIONS

English Machine Translation of JP 11230837 A, Y. Tanaka.*

(Continued)

*Primary Examiner* — Lisa Caputo
*Assistant Examiner* — Philip Cotey
(74) *Attorney, Agent, or Firm* — Harness, Dickey & Pierce, P.L.C.

(57) ABSTRACT

A sensor module includes a first member including a first recess in which a piezoelectric element including an electrode is arranged, a second member joined to the first member, a first plate in contact with the second member, a second plate in contact with the first member, and a fastening section configured to fasten the first plate and the second plate. A first projection projecting toward the second member is provided on the first plate. The internal height of the first recess of the first member is larger than the height of the piezoelectric element. The piezoelectric element is in contact with the second member.

8 Claims, 11 Drawing Sheets

(56) References Cited

U.S. PATENT DOCUMENTS

| | | | |
|---|---|---|---|
| 2008/0105052 A1* | 5/2008 | Takahashi et al. | 73/504.16 |
| 2008/0129150 A1* | 6/2008 | Zhang | 73/514.34 |
| 2008/0178691 A1* | 7/2008 | Zhang et al. | 73/862.629 |
| 2008/0190216 A1* | 8/2008 | Morimoto | 73/862.68 |
| 2008/0210022 A1* | 9/2008 | Rey et al. | 73/862.621 |
| 2009/0028671 A1* | 1/2009 | Jin et al. | 901/27 |
| 2009/0134966 A1* | 5/2009 | Baker | 338/99 |
| 2010/0058875 A1* | 3/2010 | Baumgartner et al. | 73/723 |
| 2010/0155579 A1* | 6/2010 | Torres-Jara | 250/221 |
| 2011/0266923 A1* | 11/2011 | Chuang et al. | 310/338 |
| 2011/0314923 A1* | 12/2011 | Hou et al. | 73/727 |

FOREIGN PATENT DOCUMENTS

| | | | | |
|---|---|---|---|---|
| JP | 04-231827 | | 8/1992 | |
| JP | 11-230837 | | 8/1999 | |
| JP | 11230837 A | * | 8/1999 | G01L 1/16 |
| JP | 2001-027570 | | 1/2001 | |
| JP | 2008-002953 | | 1/2008 | |
| JP | 2009-257992 | | 11/2009 | |
| JP | 2010-096525 | | 4/2010 | |
| JP | 2010-131676 A | | 6/2010 | |
| JP | 2010-203857 | | 9/2010 | |
| JP | 2010-230631 | | 10/2010 | |
| SU | 1500874 A1 | | 8/1989 | |

OTHER PUBLICATIONS

Extended European Search Report for Application No. EP 13 15 8135 dated Oct. 23, 2014 (9 pages).

* cited by examiner

SENSOR MODULE, FORCE DETECTING DEVICE, AND ROBOT

BACKGROUND

1. Technical Field

The present invention relates to a sensor module capable of detecting a force component and a force detecting device and a robot using the sensor module.

2. Related Art

There has been known a force sensor disclosed in JP-A-4-231827 (Patent Literature 1) as a force sensor (a sensor device) including a piezoelectric material. Patent Literature 1 discloses a force sensor in which a signal electrode is sandwiched by crystal disks, which are piezoelectric materials, and a measurement element sandwiched by metal cover disks is sealed in a metal ring by welding.

In the force sensor disclosed in Patent Literature 1, it is likely that dimensional errors of the signal electrode, the crystal disks, and the metal cover disks occur. It is also likely that a gap is formed in the welding because of the errors and moisture, the outdoor air, and the like intrude into the gap, whereby charges generated in the crystal disks leak to the outside to disable accurate measurement. Further, there is a problem in that a process for the welding is complicated and it is difficult to apply the process to mass production.

Therefore, a sensor element that prevents a leak and does not depend on a measurement environment can be obtained by using a sensor device shown in FIG. 12.

As shown in FIG. 12, a sensor device 200 as a whole includes a sensor element 214 in which an electrode plate 218 is sandwiched by two quartz plates 216 having the same cut surfaces and opposed to each other, a first member 202 made of metal that houses the sensor element 214, and a second member 204 made of metal that is joined to an upper surface 224, which is the outer circumference of an opening section 220 of the first member 202, and set in contact with the quartz plate 216. A coaxial connector 206 is attached to a side surface of the first member 202. The coaxial connector 206 includes an outer circumferential section 208 and a center conductor 210. Insulative resin 212 is filled between the outer circumferential section 208 and the center conductor 210. The outer circumferential section 208 and the center conductor 210 are electrically insulated. The outer circumferential section 208 is short-circuited with the first member 202 and the second member 204. The center conductor 210 is electrically connected to the electrode plate 218.

The sensor device 200 is sandwiched by pressurizing plates (not shown in the figure) and pressurized. The quartz plate 216 outputs (induces) charges to the electrode plate 218 according to a piezoelectric effect involved in the pressurization. Pressure applied to the quartz plate 216 changes according to an external force applied to the pressurizing plates. Therefore, it is possible to detect an external force applied to the sensor device 200 by monitoring, through the coaxial connector 206, a change amount of output charges due to the change in the pressure.

In the sensor device 200, to prevent the charges induced from the quartz plate 216 from leaking to the outside because of moisture or the like, the sensor element 214 is sealed by the second member 204 in a state in which the inside of the first member 202 is filled with the dry air or a state in which vacuum is maintained in the first member 202.

However, when the sensor element 214 is housed in the first member 202, a problem explained below occurs. In a manufacturing process for the first member 202 and the sensor element 214, the first member 202 and the second member 204 have dimensional errors and the sensor element 214 also has a dimensional error. Therefore, it is difficult to perform adjustment for equalizing the internal height of the first member 202 (the height from a contact surface of the first member 202 and the sensor element 214 to a contact surface on which the first member 202 and the second member 204 are joined) and the height of the sensor element 214.

As explained above, in the sensor device 200, a gap is formed between the sensor element 214 and the second member 204 because of the dimensional errors or the sensor element 214 projects from the upper surface 224 of the first member 202 and the second member 204 presses the sensor element 214. In this state, it is difficult to apply equal pressure to the sensor element 214 using the pressurizing plates.

SUMMARY

An advantage of some aspects of the invention is to solve at least a part of the problems described above, and the invention can be implemented as the following forms or application examples.

APPLICATION EXAMPLE 1

This application example of the invention is directed to a sensor module including: a sensor element in which a piezoelectric body and an electrode are laminated; a first member including a first recess in which the sensor element is arranged; a second member joined to the first member and configured to seal the first recess of the first member; a first plate in contact with the second member; a second plate in contact with the first member; and a fastening section capable of fastening the first plate and the second plate. A dimension from a contact surface of the first member and the sensor element to a surface on which the first member and the second member are joined is formed larger than a dimension of the sensor element in a direction in which the piezoelectric body and the electrode are laminated. A first projection projecting toward the second member and in contact with the second member is provided on the first plate. The sensor element is in contact with the second member.

According to this application example, the sensor device in which the sensor element is sealed in the first member is pressed by the first projection from the outer side of the second member and the second member is deformed, whereby it is possible to apply pressure to the sensor element. Therefore, irrespective of manufacturing fluctuation due to a dimensional error of the sensor device, it is possible to always apply fixed pressure to the sensor device and obtain accurate detection data without a measurement error.

APPLICATION EXAMPLE 2

In the sensor module according to the application example described above, it is preferable that a second projection projecting toward the first member and in contact with the first member is provided on the second plate.

With the configuration, a gap is formed on the bottom surface of the first member. It is possible to draw out a connecting wire from an external terminal making use of the gap. It is possible to efficiently apply pressure from the upper and lower surfaces of the sensor element. Further, it is possible to expand a gap between the first plate and the second plate and secure a space for setting a wire, a control circuit (IC), and the like.

APPLICATION EXAMPLE 3

In the sensor module according to the application example described above, it is preferable that a second recess that fits with the second projection is formed on the bottom surface of the first member.

With the configuration, the second recess of the first member and the second projection of the second plate fit with each other, whereby it is possible to position the first member and the second plate. It is possible to easily align the sensor device and the second plate.

APPLICATION EXAMPLE 4

In the sensor module according to the application example described above, it is preferable that, around a peripheral section surrounding a portion of the second member in contact with the first projection in plan view in the thickness direction of the second member, the sensor module includes a thin section having thickness smaller than the thickness of the portion in contact with the first projection.

With the configuration, the sensor module includes, in the second member, the thin section that is easily deformed. When the sensor device is pressurized by the first projection, the thin section of the second member is deformed, whereby stress is relaxed. Therefore, it is possible to keep the joined state of the first member and the second member. When applied with forces in respective axis directions, the thin section is deformed, whereby it is possible to efficiently transmit the forces to the sensor element.

APPLICATION EXAMPLE 5

In the sensor module according to the application example described above, it is preferable that, when a laminating direction of a plurality of the piezoelectric bodies laminated in the sensor element is represented as a Z-axis direction and directions orthogonal to the Z-axis direction and orthogonal to each other are respectively represented as an X-axis direction and a Y-axis direction, the sensor module includes at least a first sensor element configured to detect a force in the X-axis direction, a second sensor element configured to detect a force in the Y-axis direction, and a third sensor element configured to detect a force in the Z-axis direction.

With the configuration, positional deviation among sensor elements that detect forces in so-called three axis directions, i.e., an X direction, a Y direction, and a Z direction is controlled. Therefore, even in a sensor device that detects the forces in the three axis directions, it is possible to stably maintain the detection without spoiling high detection accuracy.

APPLICATION EXAMPLE 6

In the sensor module according to the application example described above, it is preferable that the fastening section is capable of adjusting a fastening force.

With the configuration, it is possible to apply a necessary amount of the fastening force according to a use and obtain a stable sensor characteristic.

APPLICATION EXAMPLE 7

This application example of the invention is directed to a force detecting device including: a sensor element in which a piezoelectric body and an electrode are laminated; a first member including a first recess in which the sensor element is arranged; a second member joined to the first member and configured to seal the first recess of the first member; a first plate in contact with the second member; a second plate in contact with the first member; a fastening section capable of fastening the first plate and the second plate; and an electronic circuit electrically connected to the sensor element. A dimension from a contact surface of the first member and the sensor element to a surface on which the first member and the second member are joined is formed larger than a dimension of the sensor element in a direction in which the piezoelectric body and the electrode are laminated. A first projection projecting toward the second member and in contact with the second member is provided on the first plate. The sensor element is in contact with the second member.

With the configuration, it is possible to easily subject an external force to arithmetic processing according to a charge amount and positive or negative of charges obtained from the sensor element. It is possible to obtain a three-axis force detection sensor with a simple configuration. Further, it is possible to obtain a six-axis force detection sensor, which detects forces including a force in a torque direction, by arranging a plurality of the sensor modules.

APPLICATION EXAMPLE 8

This application example of the invention is directed to a robot including: a main body section; an arm section connected to the main body section; and a hand section connected to the arm section. The robot includes a sensor module in a connecting section of the arm section and the hand section. The sensor module includes: a sensor element in which a piezoelectric body and an electrode are laminated; a first member including a first recess in which the sensor element is arranged; a second member joined to the first member and configured to seal the first recess of the first member; a first plate in contact with the second member; a second plate in contact with the first member; and a fastening section capable of fastening the first plate and the second plate. A dimension from a contact surface of the first member and the sensor element to a surface on which the first member and the second member are joined is formed larger than a dimension of the sensor element in a direction in which the piezoelectric body and the electrode are laminated. A first projection projecting toward the second member and in contact with the second member is provided on the first plate. The sensor element is in contact with the second member.

With the configuration, it is possible to surely detect, with a force detecting device, forces of contact with an obstacle and contact with a target that occur during a predetermined action of an operating robot arm or robot hand and perform safe and fine work by feeding back data to a robot control device.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
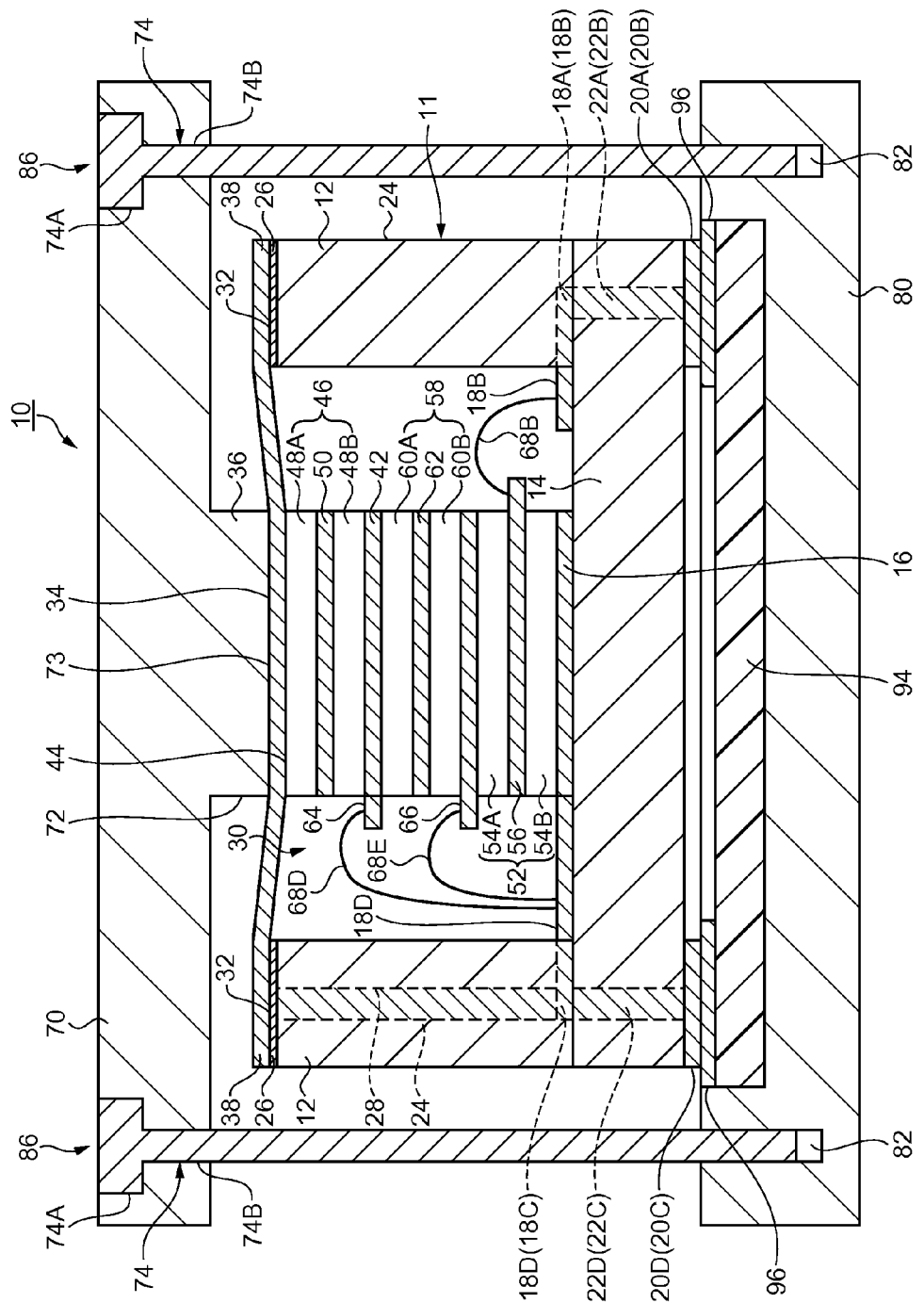
FIG. 1 is a sectional view showing the configuration of a sensor module according to a first embodiment.
Figure 2:
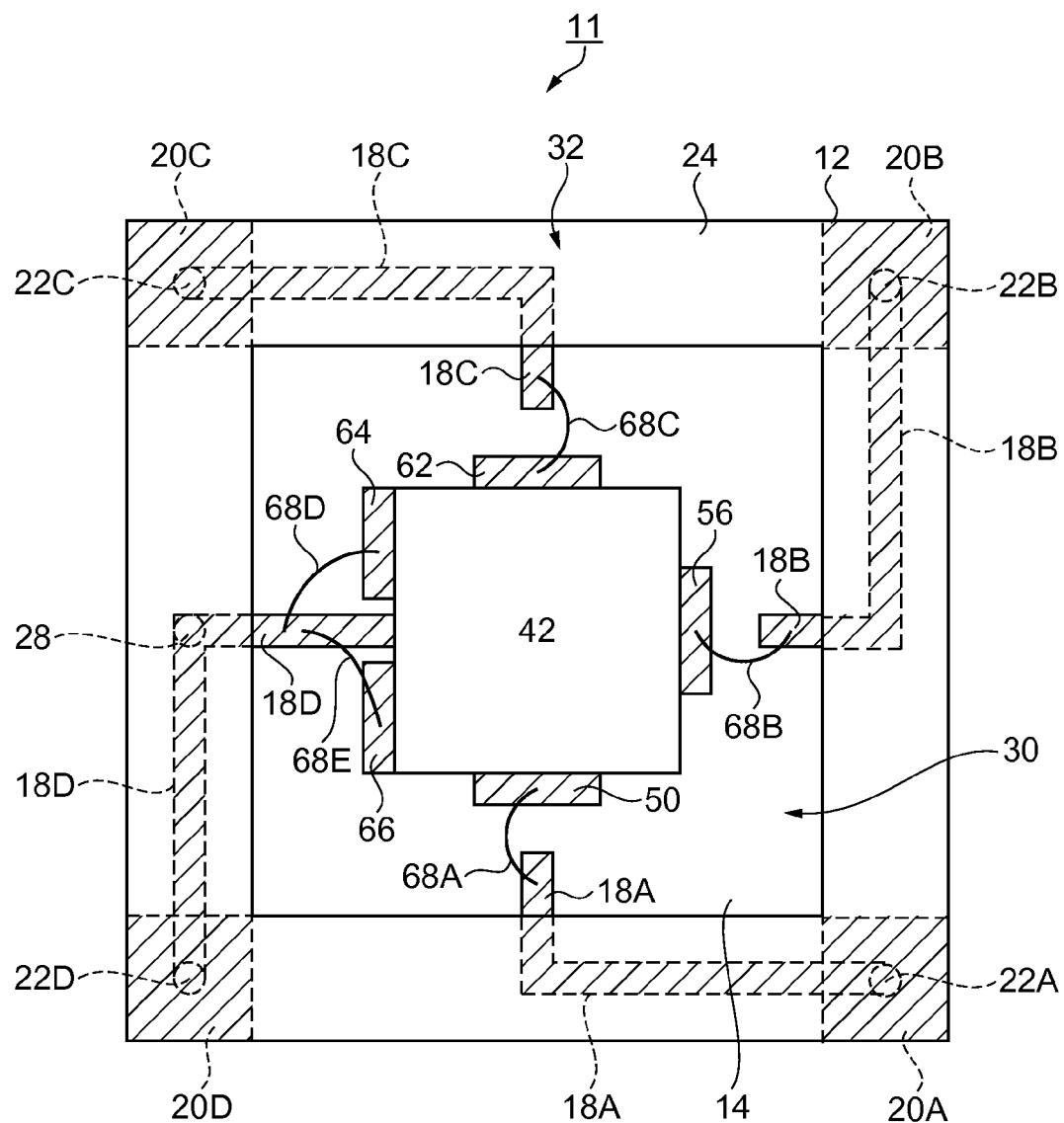
FIG. 2 is a plan view showing the configuration of a sensor device (a second member is omitted) in the first embodiment.
Figure 3:
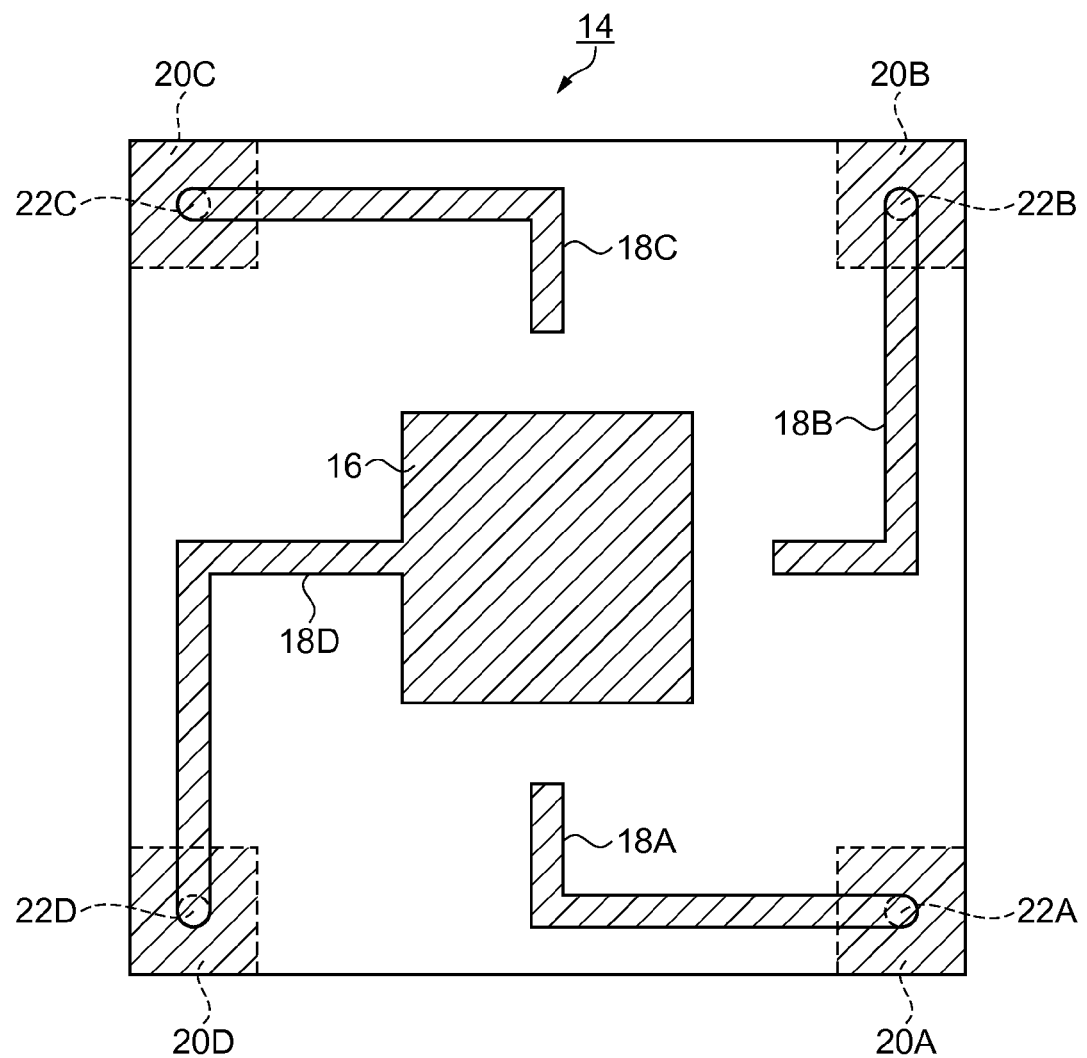
FIG. 3 is a plan view of a base member in the first embodiment.

A sensor module according to a first embodiment is explained in detail with reference to the accompanying drawings. FIG. 1 is a sectional view of the sensor module according to the first embodiment. FIG. 2 is a plan view of a sensor device (a second member is omitted) in this embodiment. FIG. 3 is a plan view of a base member in this embodiment.

Configuration of the Sensor Module

A sensor module 10 according to the first embodiment includes, as main basic components, a sensor device 11 in which a sensor element capable of detecting a force component is encapsulated in a first member 12, a first plate 70 and a second plate 80 that support the sensor device 11 to sandwich the sensor device 11 between the plates, and fastening sections 86 that fix the sensor device 11 between the first plate 70 and the second plate 80 while pressurizing the sensor device 11. The sensor device 11 in this embodiment includes, as main basic components, the first member 12, a second member 34, and a sensor element 42.

As shown in FIGS. 1 and 2, the first member 12 includes a base member 14 and a sidewall member 24, both of which are formed of an insulative material such as ceramics. The base member 14 is formed in a rectangular flat shape in plan view. The sensor element 42 is arranged on the upper surface of the base member 14. The sidewall member 24 is arranged on the base member 14 to surround (in a ring shape) the periphery of the sensor element 42.

Configuration of the Base Member

As shown in FIG. 3, a ground electrode 16 connected to the lower surface of the sensor element 42 is arranged in the center of the upper surface of the base member 14. External electrodes 20A, 20B, 20C, and 20D are arranged at the four corners of the lower surface of the base member 14. As shown in FIG. 1, the external electrodes 20A, 20B, 20C, and 20D are respectively connected to mounting electrodes 96 on an electronic circuit board 94.

As shown in FIGS. 1, 2, and 3, connection electrodes 18A, 18B, 18C, and 18D are arranged on the upper surface of the base member 14. The connection electrodes 18A, 18B, 18C, and 18D are respectively arranged to correspond to the external electrodes 20A, 20B, 20C, and 20D. One ends of the connection electrodes 18A, 18B, 18C, and 18D are respectively arranged in positions opposed to the external electrodes 20A, 20B, 20C, and 20D in plan view. The one ends of the connection electrodes 18A, 18B, 18C, and 18D and the external electrodes 20A, 20B, 20C, and 20D are electrically connected to each other via through electrodes 22A, 22B, 22C, and 22D that pierce through the base member 14. The other ends of the connection electrodes 18A, 18B, and 18C are arranged in positions in the vicinity of the ground electrode 16. The other end of the connection electrode 18D is connected to the ground electrode 16.

As shown in FIG. 2, the sidewall member 24 is laminated in a position at the peripheral edge on the base member 14. The sidewall member 24 is arranged to cover the connection electrodes 18A, 18B, 18C, and 18D. However, the sidewall member 24 is laminated on the base member 14 in a state in which the other end sides of the connection electrodes 18A, 18B, 18C, and 18D are exposed on the inner side of the sidewall member 24 and the ground electrode 16 is also exposed. As shown in FIG. 1, a metallization 26 is arranged on the upper surface of the sidewall member 24. The metallization 26 forms an upper surface 32 of the first member 12. As shown in FIGS. 1 and 2, a through electrode 28 that pierces through the sidewall member 24 in the height direction is arranged in a position of the sidewall member 24 opposed to the connection electrode 18D. The metallization 26 and the connection electrode 18D are electrically connected via the through electrode 28.

Therefore, as shown in FIGS. 1 and 2, in the first member 12, a first recess 30 is formed in the first member 12 by the sidewall member 24. An outer peripheral surface, which is the outer periphery of the first recess 30, is formed by the upper surface 32 of the sidewall member 24 on which the metallization 26 is arranged. The ground electrode 16 and the connection electrodes 18A, 18B, 18C, and 18D are formed of metal having conductivity. The metallization 26 can be formed of the same material as the ground electrode 16 and the like.

The thickness (the height) of the sidewall member 24 is set larger than the total thickness (height) of a first sensor element 46, a second sensor element 52, and a third sensor element 58 explained below.

Configuration of the Second Member

Figure 4:
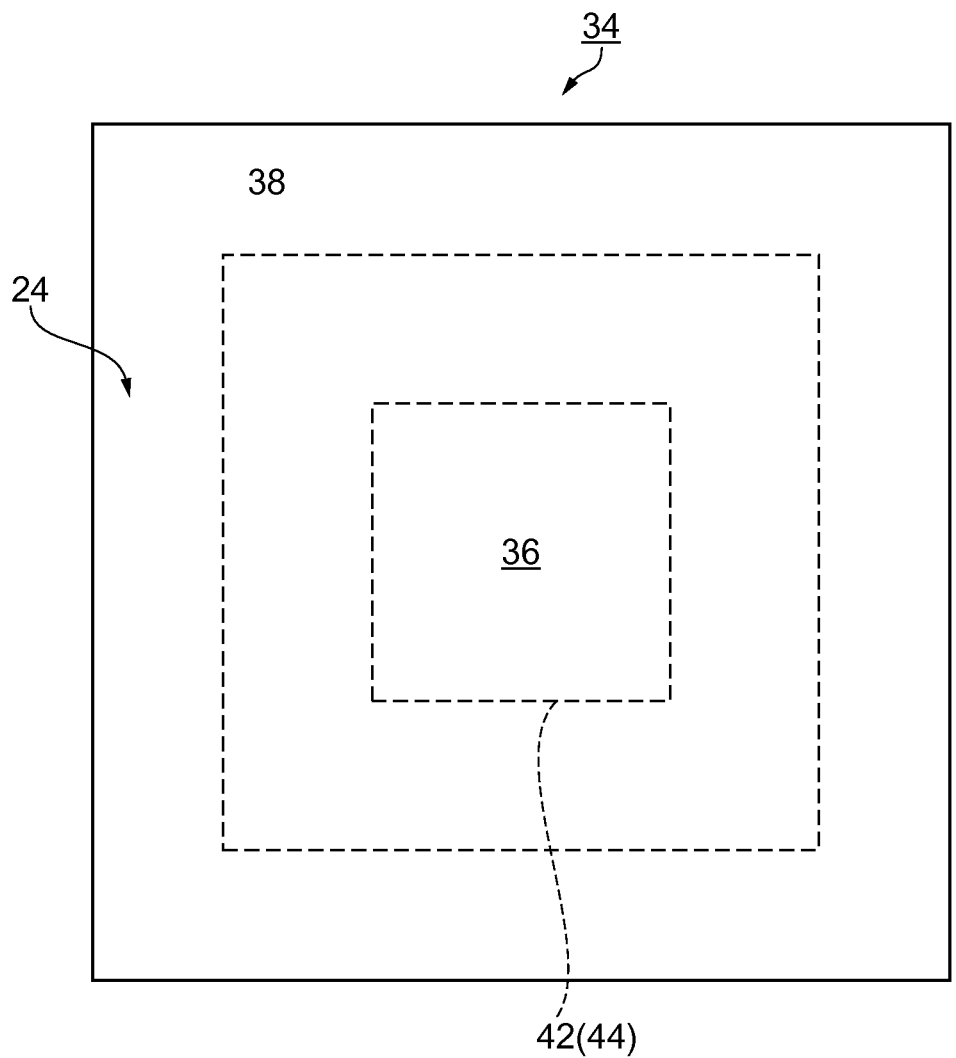
FIG. 4 is a plan view of the second member in the first embodiment.

FIG. 4 is a plan view of the sensor device viewed from the upper surface through the first plate of the sensor module according to this embodiment. As shown in FIGS. 1 and 4, the second member 34 is formed of metal such as stainless steel or Kovar in a substantially rectangular shape. A position of the second member 34 overlapping the sidewall member 24 in plan view is a rectangular ring-like peripheral edge section 38. The inner side of the peripheral edge section 38 is a force transmitting section 36. The force transmitting section 36 is larger than an upper surface 44, which is a force receiving surface of the sensor element 42 explained below, and smaller than the peripheral edge section 38 in plan view of the second member 34. Further, a recess is formed between the peripheral edge section 38 and the force transmitting section 36 in sectional view of the second member 34. The second member 34 in this embodiment can be formed by press molding or etching. The force transmitting section 36 is in surface-contact with the entire surface of the upper surface 44, which is the force receiving surface of the sensor element 42, in a state in which pressure is applied to the force transmitting section 36 by a first plate 70 explained below.

As shown in FIG. 1, the peripheral edge section 38 is joined to the metallization 26, which forms the upper surface 32 of the sidewall member 24, by seam welding. The seam welding is performed under a dry atmosphere or under a vacuum atmosphere. The sensor element 42 is hermetically sealed in the first member 12 by the seam welding of the second member 34 and the metallization 26. The second member 34 is electrically connected to the connection electrode 18D via the metallization 26 and the through electrode 28.

Configuration of the Sensor Element

As shown in FIG. 1, the sensor element 42 includes a tabular substrate formed of, for example, quartz, lead zirconate titanate (PZT: Pb(Zr,Ti)O$_3$), lithium niobate, or lithium tantalate having piezoelectricity. In this embodiment, a quartz plate is used as a piezoelectric body. The sensor element 42 is formed by laminating the first sensor element 46, the third sensor element 58, and the second sensor element 52 in order from the top. The first sensor element 46 is formed such that first quartz plates 48A and 48B sandwich a first detection electrode 50. The second sensor element 52 is formed such that second quartz plates 54A and 54B sandwich a second detection electrode 56. The third sensor element 58 is formed such that third quartz plates 60A and 60B sandwich a third detection electrode 62.

A first ground electrode 64 functioning as an electrode is arranged between the first sensor element 46 (the first quartz plate 48B) and the third sensor element 58 (the third quartz plate 60A). A second ground electrode 66 is arranged between the third sensor element 58 (the third quartz plate 60B) and the second sensor element 52 (the second quartz plate 54A). The upper surface of the first sensor element 46 (the first quartz plate 48A) is the upper surface 44 of the sensor element 42. The upper surface is in surface-contact with the force transmitting section 36 of the second member 34 and grounded. The lower surface of the second sensor element 52 (the second quartz plate 54B) is grounded by being connected to the ground electrode 16.

As shown in FIG. 2, the first detection electrode 50, the second detection electrode 56, the third detection electrode 62, the first ground electrode 64, and the second ground electrode 66 are respectively arranged such that parts thereof extend beyond the laminated first to third quartz plates. The first detection electrode 50 is connected to an exposed portion (the other end side) of the connection electrode 18A by a conductive wire 68A. The second detection electrode 56 is connected to an exposed portion (the other end side) of the connection electrode 18B by a wire 68B. The third detection electrode 62 is connected to an exposed portion (the other end side) of the connection electrode 18C by a wire 68C. The first ground electrode 64 and the second ground electrode 66 are respectively connected to an exposed portion (the other end side) of the connection electrode 18D by wires 68D and 68E.

According to the connection explained above, the external electrode 20A is electrically connected to the first detection electrode 50 via the through electrode 22A, the connection electrode 18A, and the wire 68A. The external electrode 20B is electrically connected to the second detection electrode 56 via the through electrode 22B, the connection electrode 18B, and the wire 68B. The external electrode 20C is electrically connected to the third detection electrode 62 via the through electrode 22C, the connection electrode 18C, and the wire 68C.

The external electrode 20D is electrically connected to the ground electrode 16 via the through electrode 22D and the connection electrode 18D. Further, the external electrode 20D is electrically connected to the first ground electrode 64 via the wire 68D connected to the connection electrode 18D, electrically connected to the second ground electrode 66 via the wire 68E connected to the connection electrode 18D, and electrically connected to the second member 34 via the through electrode 28 and the metallization 26 connected to the connection electrode 18D.

As the material of the various electrodes, a simple substance or an alloy of gold, titanium, aluminum, copper, iron, or the like can be used. For example, stainless steel can be used as an iron alloy. The stainless steel is suitably used because the stainless steel is excellent in durability and corrosion resistance.

Figure 5:
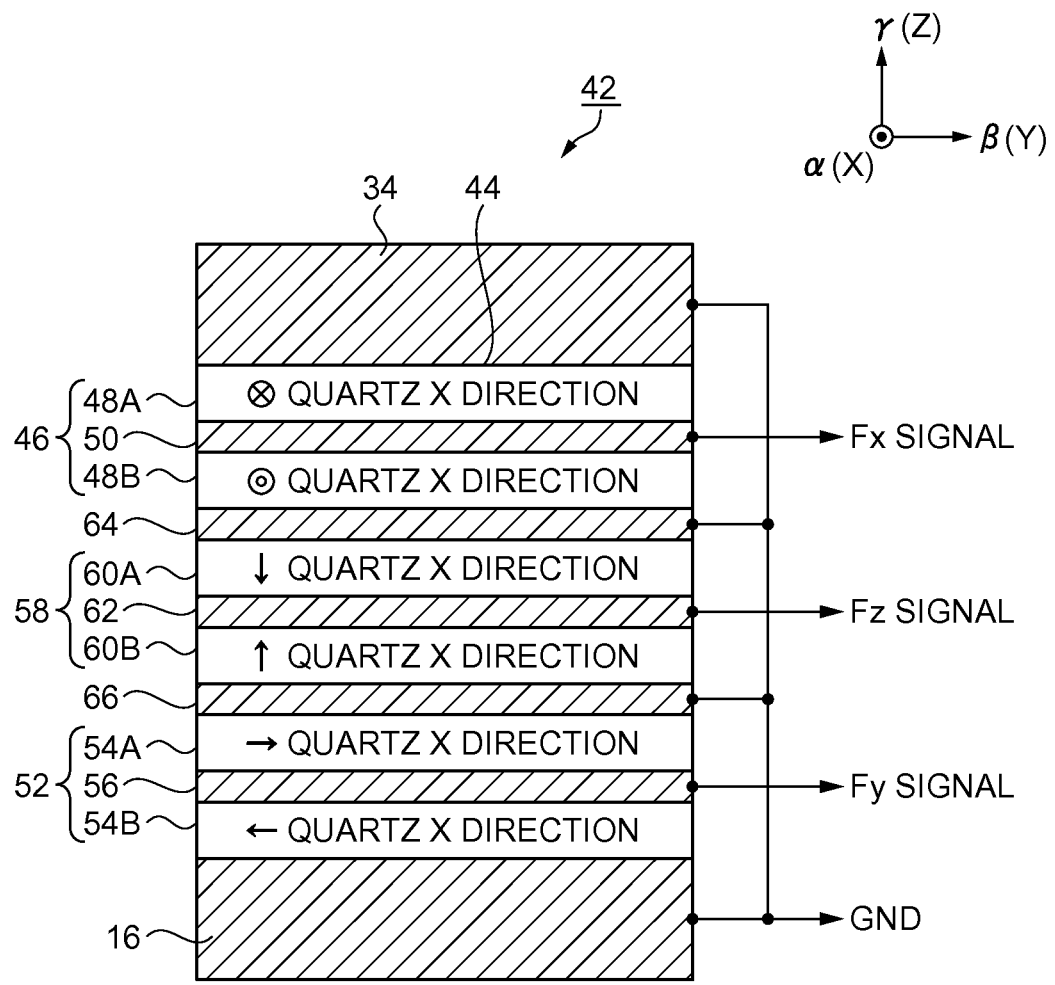
FIG. 5 is a schematic diagram showing the configuration of a sensor element in the first embodiment.

FIG. 5 is a schematic diagram of the sensor element according to this embodiment. In this embodiment, the force transmitting section 36 can transmit not only a force in a direction parallel to the normal direction (a γ axis) of the upper surface 44 of the sensor element 42 but also forces in the surface direction of the upper surface 44, i.e., forces in two directions (an α axis and a β axis) orthogonal to the γ axis and orthogonal to each other. The sensor element 42 can detect forces respectively parallel to the α axis, the β axis, and the γ axis as explained below.

In the first sensor element 46, the first quartz plates 48A and 48B are formed of Y-cut quartz plates. The first quartz plates 48A and 48B have crystal orientations in which X directions, which are crystal orientations for generating the piezoelectric effect, are directions perpendicular to the normal of the first quartz plates 48A and 48B (a direction parallel to the γ axis in FIG. 5). The first quartz plates 48A and 48B are arranged such that the X directions thereof are in opposite directions each other. Further, the first quartz plates 48A and 48B are arranged such that the X directions are parallel to the α axis of a spatial orthogonal coordinate.

In the second sensor element 52, the second quartz plates 54A and 54B are formed of Y-cut quartz plates. The second quartz plates 54A and 54B have crystal orientations in which X directions are directions perpendicular to the normal of the second quartz plates 54A and 54B (a direction parallel to the γ axis). The second quartz plates 54A and 54B are arranged such that the X directions thereof are in opposite directions each other. Further, the second quartz plates 54A and 54B are arranged such that the X directions are parallel to the β axis of the spatial orthogonal coordinate.

In the third sensor element 58, the third quartz plates 60A and 60B are formed of X-cut quartz plates. The third quartz plates 60A and 60B have crystal orientations in which X directions are directions parallel to the normal of the third quartz plates 60A and 60B (a direction parallel to the γ axis). The third quartz plates 60A and 60B are arranged such that the X directions thereof are in opposite directions each other. Further, the third quartz plates 60A and 60B are arranged such that the X directions are parallel to the γ axis of the spatial orthogonal coordinate.

As shown in FIG. 5, in the sensor element 42 in this embodiment, the direction parallel to the γ axis of the spatial orthogonal coordinate is set as the height direction of the sensor element 42. The sensor element 42 is sandwiched by the first plate 70 and the second plate 80 explained below from the direction of the γ axis and pressurized. Pressure is applied to the sensor element 42 via a first projection 72 from the direction parallel to the γ axis. Consequently, the third quartz plates 60A and 60B receive pressure (compression forces) from the X directions. Therefore, charges are induced by the piezoelectric effect. The charges (an Fz signal) are output to the third detection electrode 62.

In the configuration explained above, when an external force, with which the relative positions of the first plate 70 and the second plate 80 (see FIGS. 10A and 10B) shift from each other in a direction parallel to the α axis, is applied to the first plate 70 and the second plate 80, the external force in the direction parallel to the α axis direction is applied to the sensor element 42 via the first projection 72. Then, the first quartz plates 48A and 48B receive external forces (shearing forces) from the X directions. Therefore, charges are induced by the piezoelectric effect. The charges (an Fx signal) are output to the first detection electrode 50.

When an external force, with which the relative positions of the first plate 70 and the second plate 80 (see FIGS. 10A and 10B) shift from each other in a direction parallel to the β axis, is applied to the first plate 70 and the second plate 80, the external force in the direction parallel to the β axis direction is applied to the sensor element 42 via the first projection 72. Then, the second quartz plates 54A and 54B receive external forces (shearing forces) from the X directions. Therefore, charges are induced by the piezoelectric effect. The charges (an Fy signal) are output to the second detection electrode 56.

Further, when an external force, with which the relative positions of the first plate 70 and the second plate 80 (see FIGS. 10A and 10B) shift from each other in the direction parallel to the γ axis, is applied to the first plate 70 and the second plate 80, the external force in the direction parallel to the γ axis direction is applied to the sensor element 42 via the first projection 72. Then, the third quartz plates 60A and 60B receive external forces (compression forces or tensile forces) from the X directions. Therefore, charge amounts induced by the piezoelectric effect change. The magnitude of the charges (the Fz signal) output to the third detection electrode 62 changes.

Therefore, the sensor device 11 in this embodiment can monitor the charges (the Fx signal) output to the first detection electrode 50 via the external electrode 20A, the charges (the Fy signal) output to the second detection electrode 56 via the external electrode 20B, and the charges (the Fz signal) output to the third detection electrode 62 via the external electrode 20C. The sensor device 11 can detect the external forces (Fx, Fy, and Fz) in the directions parallel to the α axis (an X axis explained below), the β axis (a Y axis explained below), and the γ axis (a Z axis explained below) orthogonal to one another. The sensor element 42 has the laminated structure of the first sensor element 46, the second sensor element 52, and the third sensor element 58. However, at least one or more of the first sensor element 46, the second sensor element 52, and the third sensor element 58 may be used in the sensor element 42.

Manufacturing Method for the Sensor Device

Figure 6:
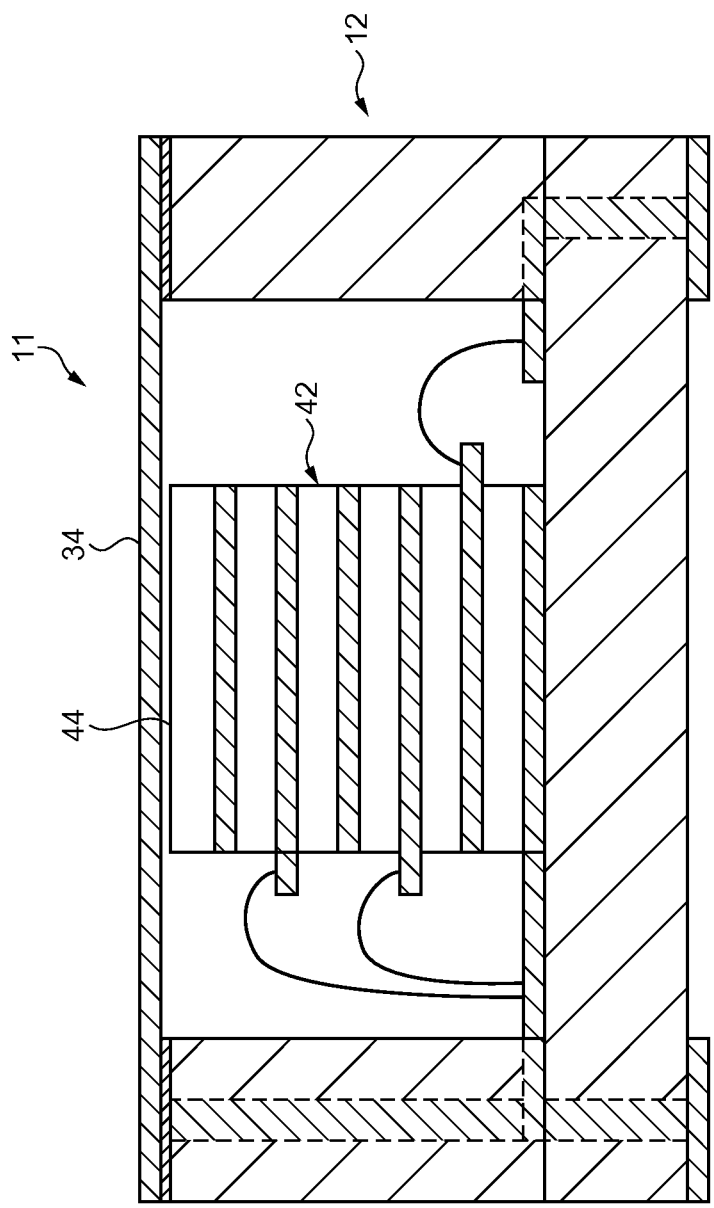
FIG. 6 is an explanatory diagram of a state in which a first member and the second member are welded to house the sensor element.

As a manufacturing method for the sensor device 11, as shown in FIG. 6, first, the sensor element 42 is placed on the base member 14. Subsequently, the peripheral edge section 38 of the second member 34 is arranged to coincide with the upper surface of the sidewall member 24 of the first member 12. A weight is arranged in the center of the second member 34 to apply a load to the second member 34. A roller electrode is pressed against a connecting position of the second member 34 to the metallization 26 (the sidewall member 24). An electric current is applied to the roller electrode to join the second member 34 and the metallization 26 using the seam welding.

As explained above, in the sensor device 11, a gap is formed between the sensor element 42 and the second member 34.

Configuration of the First and Second Plates

The first plate 70 in this embodiment is a substantially rectangular plate larger than the first member 12 in plan view. As the material of the first plate 70, a metal material such as stainless steel is used. The first plate 70 can be formed to be easily machined while having predetermined strength. In the first plate 70, the first projection 72 having a convex shape projecting toward the second member 34 is formed on a principal plane on the first member 12 side. The first projection 72 includes a pressing surface 73 that overlaps the entire region of the upper surface 44 of the sensor element 42 in plan view and fits on the inside of a region of the inner peripheral edge of the first member 12. In other words, the area of the pressing surface 73 is formed equal to or larger than the area of the upper surface of the sensor element 42 and smaller than the area of the inner peripheral edge of the first substrate 12 (formed smaller than the force transmitting section 36 of the second member 34). The first projection 72 can be formed by pressing, etching, or the like. In the first plate 70, through-holes 74 into which the fastening sections 86 such as bolts explained below are inserted are formed. The through-holes 74 include first holes 74A into which heads of the fastening sections 86 are inserted and second holes 74B into which shafts of the fastening sections 86 are inserted.

The second plate 80 is a plate larger than the first member 12 in plan view and having a shape substantially the same as the shape of the first plate 70. In the second plate 80, screw holes 82 into which male threads of the fastening sections 86 explained blow are screwed are formed. As the material of the second plate 80, a metal material such as stainless steel is used. The second plate 80 can be formed to be easily machined while having predetermined strength. The electronic circuit board 94 is formed on the upper surface of the second plate 80. The electronic circuit board 94 is configured to be electrically connectable to the external electrodes 20A, 20B, 20C, and 20D of the sensor device 11. The first plate 70 and the second plate 80 may be formed in a disk shape, an elliptical shape, or a polygonal shape other than the rectangular shape in plan view.

The fastening sections 86 are members that fasten the first plate 70 and the second plate 80 in a state in which the first plate 70 and the second plate 80 sandwich the sensor device 11. The fastening sections 86 in this embodiment are fastening bolts. The fastening bolts include heads and shafts. Male threads subjected to threading are formed at the distal ends of the shafts. The male threads can be screwed into the screw holes 82 of the second plate 80. The fastening sections 86 only have to be capable of fixing the sensor device 11 while pressurizing the sensor device 11 between the first plate 70 and the second plate 80. In this embodiment, as an example, the fastening sections 86 are set in two places to hold the sensor device 11 therebetween. In this way, a fastening force for the first plate 70 and the second plate 80 can be adjusted by the fastening sections 86. The adjustment of the fastening force is adjustment of the gap between the first plate 70 and the second plate 80 as well.

Assembly of the Sensor Module

As assembly of the sensor module 10, first, the sensor device 11 is placed on the electronic circuit board 94 formed on a mounting surface of the second plate 80 to electrically connect the external electrodes 20A, 20B, 20C, and 20D and the mounting electrode 96. The first plate 70 is arranged on the sensor device 11 such that the first projection 72 and the upper surface of the sensor element 42 of the sensor device 11 overlap in plan view. Subsequently, the fastening bolts functioning as the fastening sections 86 are inserted from the through-holes 74 of the first plate 70 and screwed into the screw holes 82 of the second plate 80. At this point, a fastening amount of the fastening sections 86 can be adjusted such that predetermined pressure (e.g., about 10 kN) is applied.

Effects

With the sensor module having the configuration explained above, it is possible to apply predetermined pressure, which is applied to the sensor element 42, to the sensor device 11, in which the sensor element 42 is sealed in the first member 12, from the outer side of the second member 34 via the first projection 72.

As explained above, it is possible to always apply fixed pressure to the sensor element 42 and obtain accurate detection data without a measuring error. Therefore, the yield of the sensor device 11 is improved. Further, even in use under an environment exposed to, for example, liquid such as lubricant, water, or chemical, it is possible to protect the sensor element 42 in the second member 34. Therefore, it is possible to obtain the sensor module 10 having high reliability.

Second Embodiment

Figure 7:
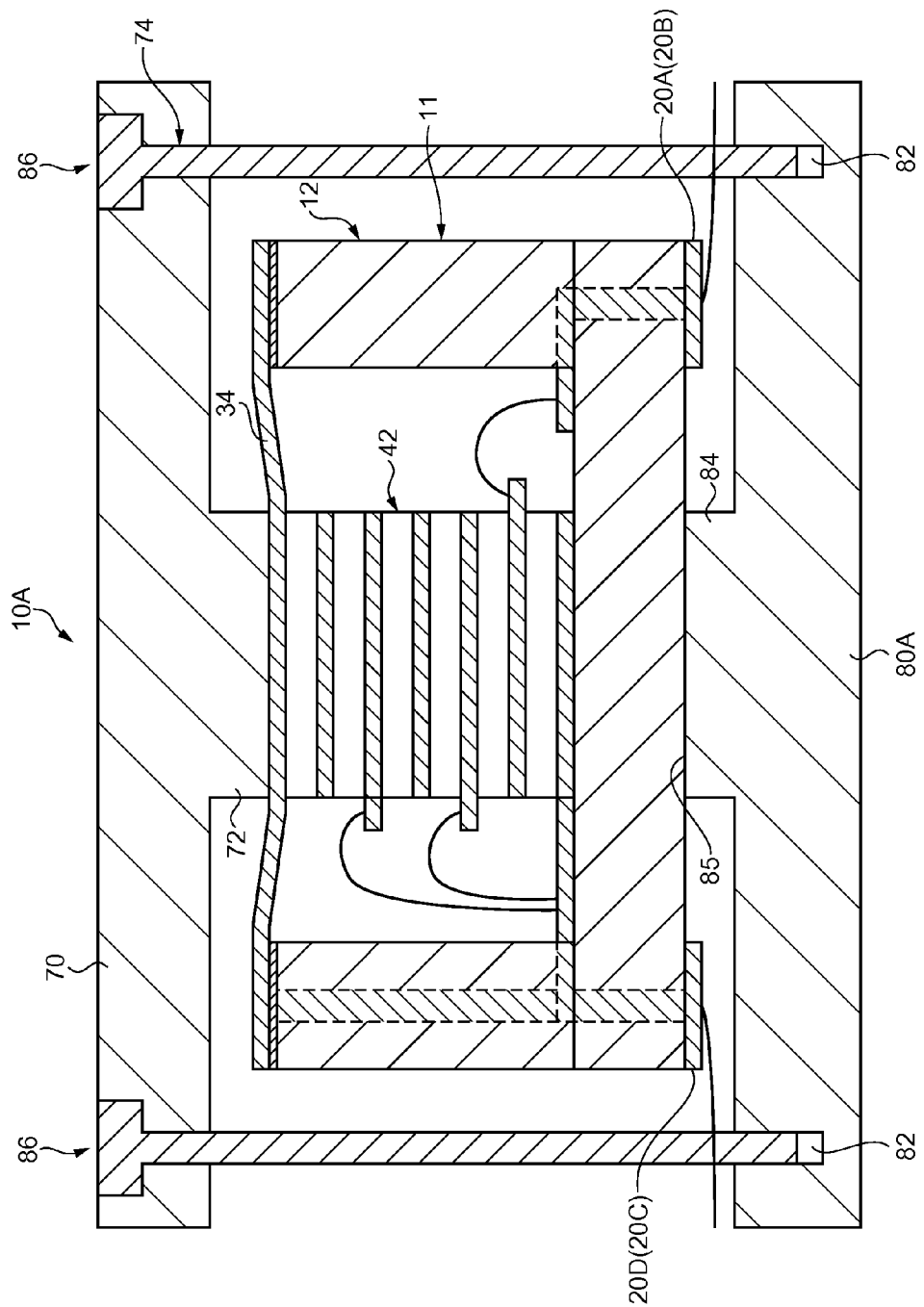
FIG. 7 is a sectional view of a sensor module according to a second embodiment.

FIG. 7 is a sectional view of a sensor module according to a second embodiment. In a sensor module 10A according to the second embodiment, a second projection 84 is provided instead of the electronic circuit board 94 of the second plate 80 in the first embodiment. The other components are the same as the components of the sensor module 10 according to the first embodiment. The components are denoted by the same reference numerals and signs and detailed explanation of the components is omitted.

In a second plate 80A, the second projection 84 having a shape substantially the same as the shape of the first projection 72 is formed on a mounting surface on which the sensor device 11 is mounted. The second projection 84 includes a pressing surface 85 having an area smaller than the bottom surface of the first member 12 and equal to or larger than the area of the bottom surface of the sensor element 42 in plan view.

With the sensor module 10A according to the second embodiment having the configuration explained above, it is possible to equally and effectively pressurize the sensor element 42 of the sensor device 11 from the upper and lower surfaces. Gaps are formed between the external electrodes 20A, 20B, 20C, and 20D formed on the bottom surface of the sensor device 11 and the second plate 80A. Therefore, it is possible to make it easy to draw out a metal wire and it is possible to electrically connect the sensor module 10A to an external electronic circuit board easily.

Third Embodiment

Figure 8:
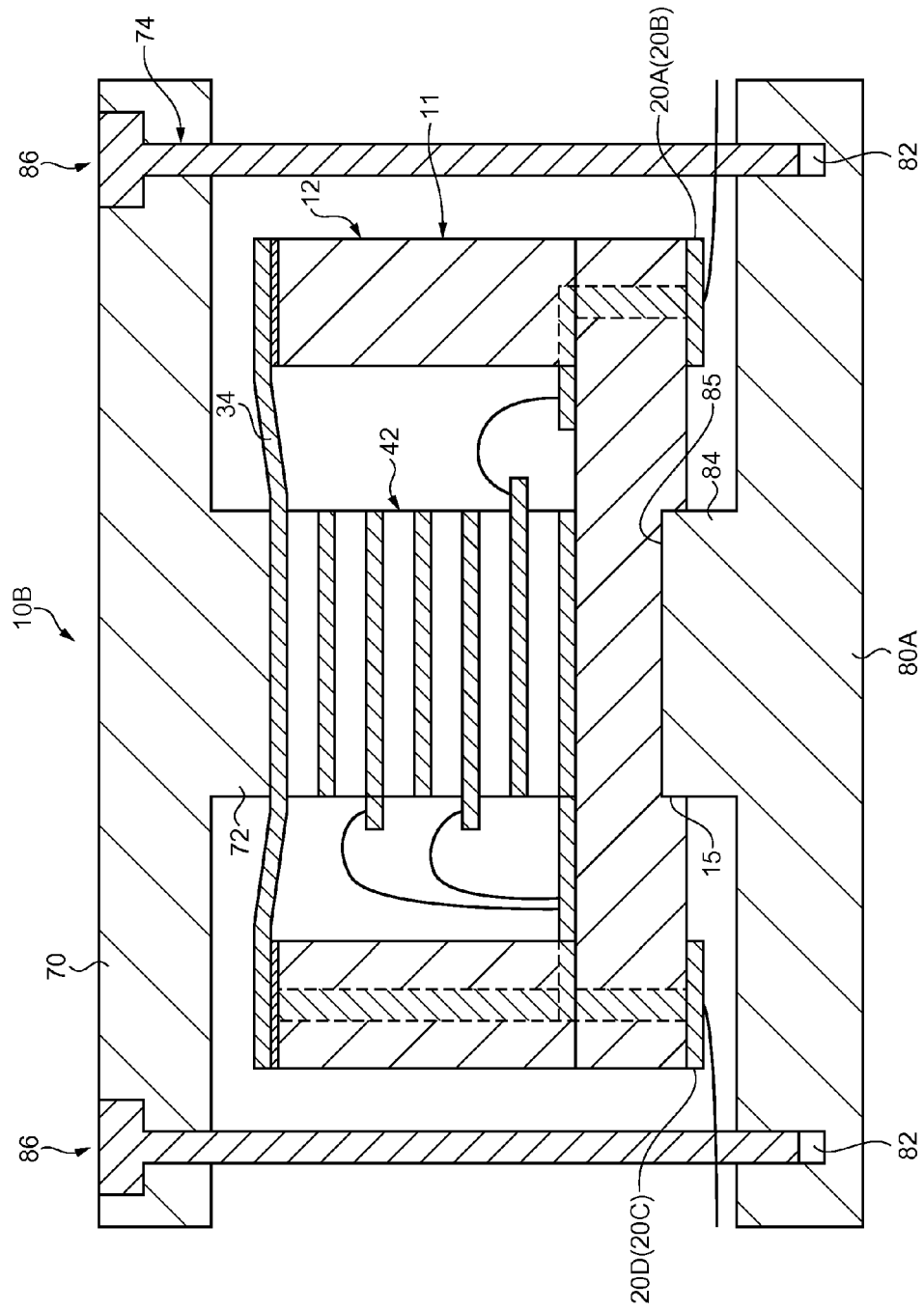
FIG. 8 is a sectional view of a sensor module according to a third embodiment.

FIG. 8 is a sectional view of a sensor module according to a third embodiment. In a sensor module 10B according to the third embodiment, a second recess 15 in which the second projection 84 fits is formed on the bottom surface of the first member 12. The other components are the same as the components of the sensor module 10A according to the second embodiment. The components are denoted by the same reference numerals and signs and detailed explanation of the components is omitted.

The second recess 15 in this embodiment is formed on the bottom surface of the base member 14 of the first member 12 and in a position opposed to the bottom surface of the sensor element 42. The second recess 15 can be formed using pressing, etching, or the like to have a downward concave shape in which the second projection 84 fits.

With the sensor module 10B according to the third embodiment having the configuration explained above, it is possible to easily position the center of the sensor element 42 placed on the base member 14 and the center of the second projection 84 of the second plate 80A to be on the same straight line in plan view. Therefore, it is possible to equally apply pressure to the sensor element 42.

Fourth Embodiment

Figure 9:
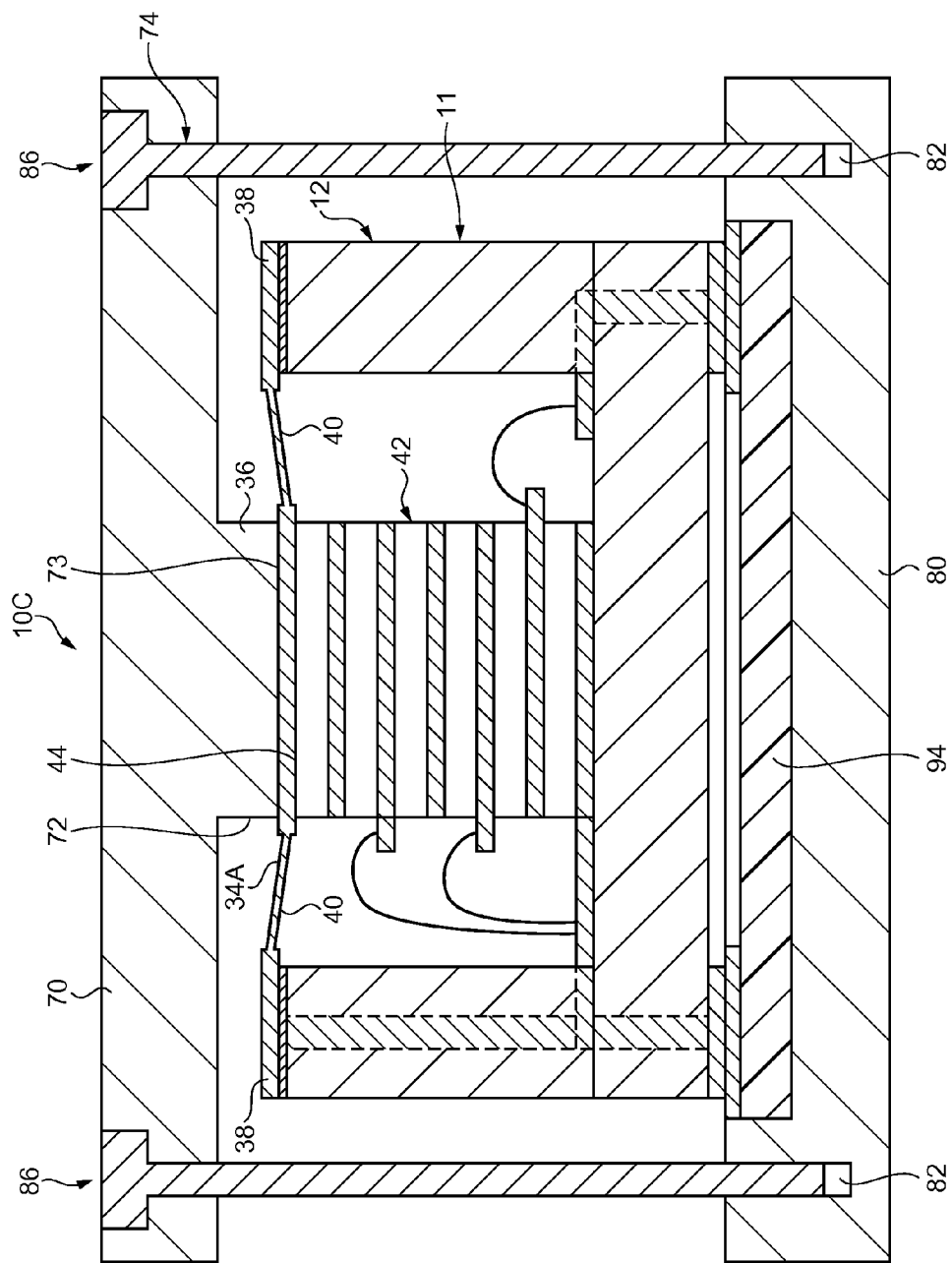
FIG. 9 is a sectional view of a sensor module according to a fourth embodiment.

FIG. 9 is a sectional view of a sensor module according to a fourth embodiment. In a sensor module 10C according to the fourth embodiment, a thin section 40 is formed in a second member 34A. The other components are the same as the components of the sensor module 10 according to the first embodiment. The components are denoted by the same reference numerals and signs and detailed explanation of the components is omitted.

The thin section 40 is formed in a ring shape between the peripheral edge section 38 of the second member 34A and the force transmitting section 36 in plan view. The thin section 40 is arranged such that the peripheral edge of the upper surface 44 of the sensor element 42 is fit in the inner circumference of the thin section 40 in plan view. The thin section 40 is formed such that the thickness of the thin section 40 is smaller than the thicknesses of the force transmitting section 36 and the peripheral edge section 38 in a state in which the thin section 40 is engraved from both surfaces or one surface of the second member 34A. The thin section 40 can be formed by pressing or etching.

In the sensor module 10C according to the fourth embodiment having the configuration explained above, the thin section 40 of the second member 34A is easily deformed by the pressurization by the first projection 72. Therefore, stress is not applied to the second member 34A and the joining of the first member 12 and the second member 34A is not broken. Consequently, it is possible to keep the inside of the sensor device 11 hermetically sealed.

The thin section 40 may be applied to the second members of the sensor modules according to the second and third embodiments.

Fifth Embodiment

Figure 10A:
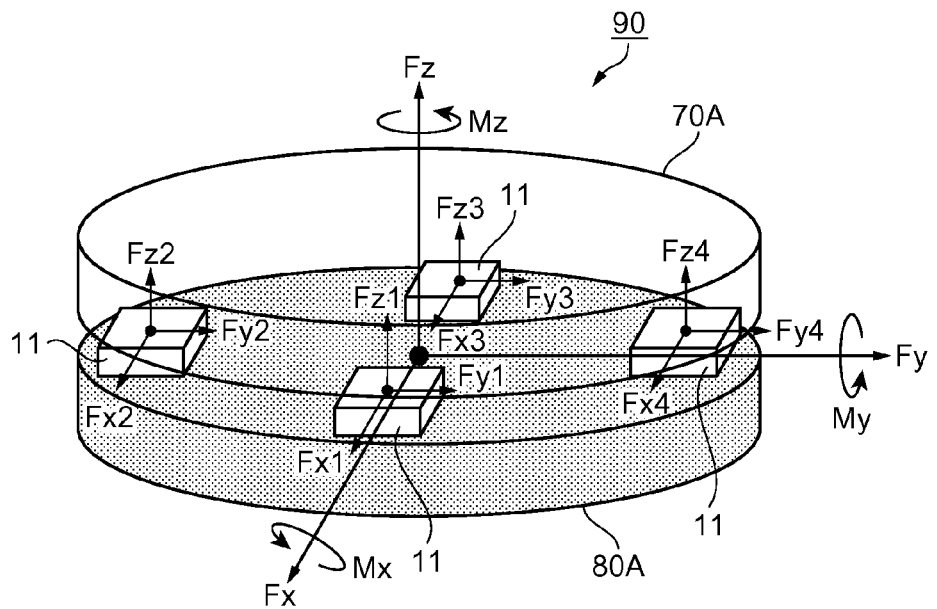
FIG. 10A is a schematic diagram showing a force detecting device according to a fifth embodiment.
Figure 10B:
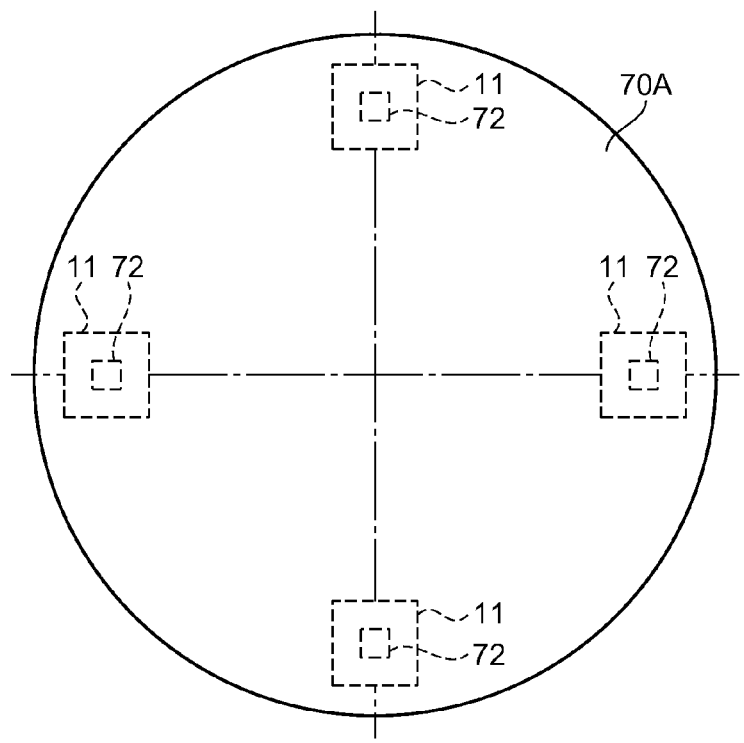
FIG. 10B is a plan view showing the force detecting device.

A force detecting device according to a fifth embodiment is shown in FIGS. 10A and 10B. FIG. 10A is a schematic diagram of the force detecting device. FIG. 10B is a plan view of the force detecting device. A force detecting device 90 according to this embodiment has a configuration in which four sensor devices 11 are sandwiched by a first plate 70A and a second plate 80A. Both the first and second plates 70A and 80A are formed in a disk shape in plan view. The four sensor devices 11 are arranged on lines passing the center of the force detecting device 90 and orthogonal to each other. On the first plate 70A, four first projections 72 are formed in places opposed to the upper surfaces of the sensor elements 42 of the sensor devices 11. On the second plate 80A, four electronic circuit boards are formed in places where the sensor devices 11 are arranged.

In the force detecting device 90 having the configuration explained above, the four sensor devices 11 are sandwiched by the first plate 70A and the second plate 80A and pressurized in a state in which all the four sensor devices 11 face the same direction. For example, in the sensor module 10, a detection axis of the first sensor element 46 (FIGS. 1 and 5) is directed to a direction parallel to Fx, a detection axis of the second sensor element 52 (FIGS. 1 and 5) is directed to a direction parallel to Fy, and a detection axis of the third sensor element 58 (FIGS. 1 and 5) is directed to a direction parallel to Fz. The height of sensor elements of sensor modules 10 is measured in advance and a projection amount of the first projections 72 is adjusted by grinding or the like on the basis of a value of the measurement. Consequently, even if manufacturing fluctuation of the sensor devices 11 occurs, it is possible to uniformly pressurize the first plate 70A and the second plate 80A while keeping parallelism between the first plate 70A and the second plate 80A.

When the first plate 70A and the second plate 80A receive a force with which the relative positions of the first plate 70A and the second plate 80A shift from each other in the Fx direction, the modules 10 respectively detect forces of Fx1, Fx2, Fx3, and Fx4. When the first plate 70A and the second plate 80A receive a force with which the relative positions of the first plate 70A and the second plate 80A shift from each other in the Fy direction, the modules 10 respectively detect forces of Fy1, Fy2, Fy3, and Fy4. Further, when the first plate 70A and the second plate 80A receive a force with which the relative positions of the first plate 70A and the second plate 80A shift from each other in the Fz direction, the modules 10 respectively detect forces of Fz1, Fz2, Fz3, and Fz4.

Therefore, in the force detecting device 90, forces Fx, Fy, and Fz orthogonal to one another, torque Mx around a rotation axis in a direction parallel to Fx, torque My around a rotation axis in a direction parallel to Fy, and torque Mz around a rotation axis in a direction parallel to Fz can be calculated as shown below.

$$Fx = Fx1 + Fx2 + Fx3 + Fx4$$

$$Fy = Fy1 + Fy2 + Fy3 + Fy4$$

$$Fz = Fz1 + Fz2 + Fz3 + Fz4$$

$$Mx = b \times (Fz4 - Fz2)$$

$$My = a \times (Fz3 - Fz1)$$

$$Mz = b \times (Fx2 - Fx4) + a \times (Fy1 - Fy3)$$

In the above equations, a and b are constants. Therefore, the force detecting device 90 according to this embodiment can detect forces from all three-dimensional directions (forces in six axis directions). The force detecting device 90 can stably perform highly accurate detection of forces even with a small displacement amount.

In the explanation in this embodiment, the four sensors are used. However, the forces Fx, Fy, Fz, Mx, My, and Mz can be detected as long as three or more sensors are used.

Sixth Embodiment

Figure 11:
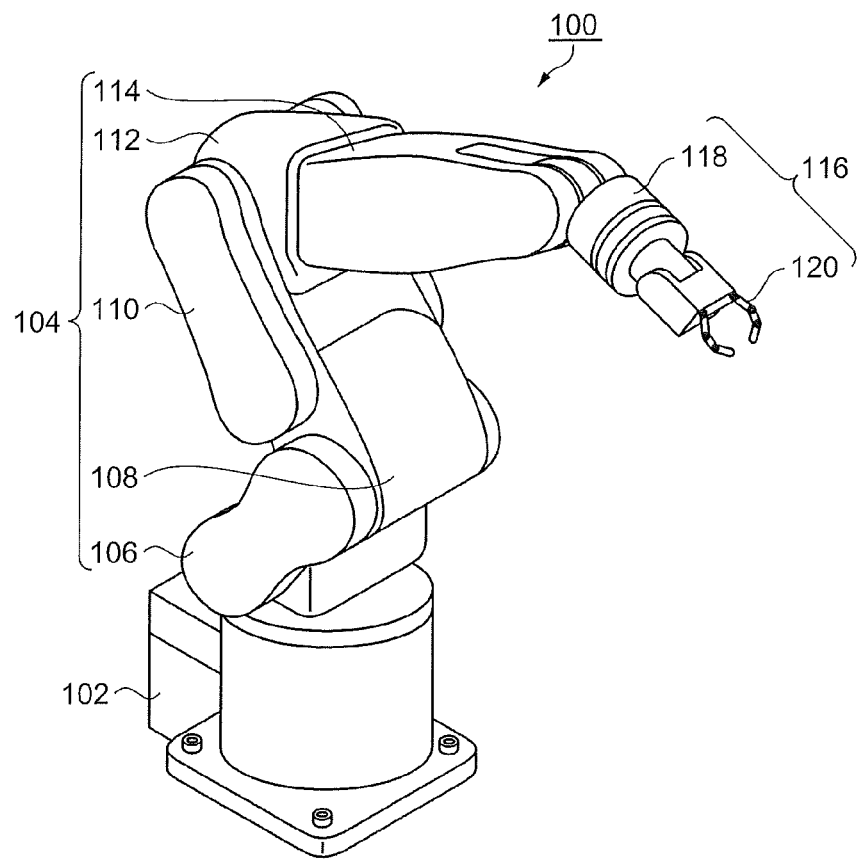
FIG. 11 is a schematic diagram of a robot mounted with a force detecting device according to a sixth embodiment.
Figure 12:
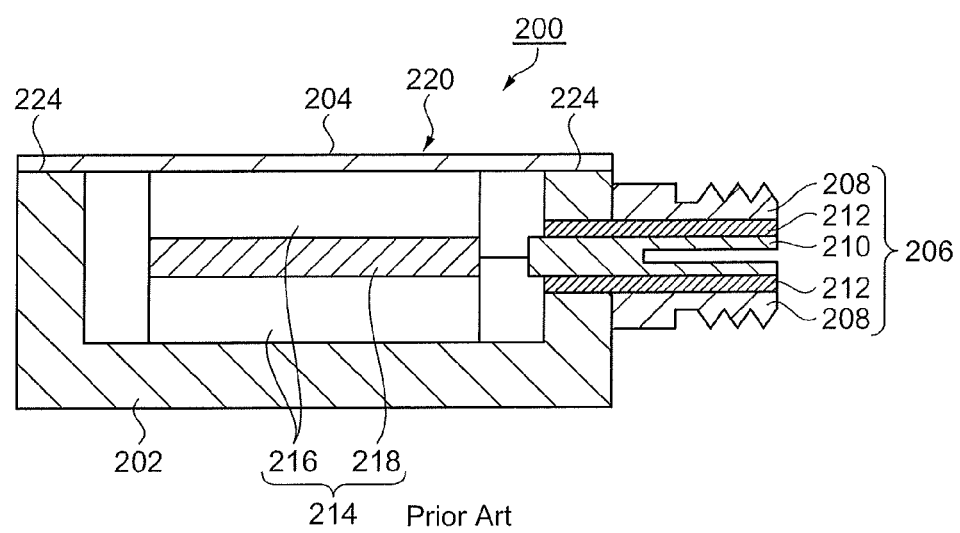
FIG. 12 is a schematic diagram of a sensor device of a technique in the past.

In FIG. 11, a robot mounted with a force detecting device according to a sixth embodiment is shown. As shown in FIG. 11, a robot 100 includes a main body section 102, an arm section 104, and a robot hand section 116. The main body section 102 is fixed on, for example, the floor, the wall, the ceiling, or a movable cart. The arm section 104 is provided to be movable with respect to the main body section 102. An actuator (not shown in the figure) that generates power for rotating the arm section 104 and a control section or the like (not shown in the figure) that controls the actuator are incorporated in the main body section 102.

The arm section 104 includes a first frame 106, a second frame 108, a third frame 110, a fourth frame 112, and a fifth frame 114. The first frame 106 is connected to the main body section 102 to be rotatable or bendable via a rotating and bending shaft. The second frame 108 is connected to the first frame 106 and the third frame 110 via rotating and bending shafts. The third frame 110 is connected to the second frame 108 and the fourth frame 112 via rotating and bending shafts. The fourth frame 112 is connected to the third frame 110 and the fifth frame 114 via rotating and bending shafts. The fifth frame 114 is connected to the fourth frame 112 via a rotating and bending shaft. The frames complexly rotate or bend about the rotating and bending shafts according to the control by the control section, whereby the arm section 104 is driven.

The robot hand section 116 is attached to the distal end of the fifth frame 114. A robot hand 120 that can grip a target is connected to the fifth frame 114 via a robot hand connecting section 118 that incorporates a motor (not shown in the figure) for rotating the robot hand connecting section 118.

In the robot hand connecting section 118, the force detecting device 90 (not shown in FIG. 11) is incorporated in addition to the motor. When the robot hand section 116 is moved to a predetermined operation position according to the control by the control section, it is possible to detect, with the force detecting device 90, as a force, contact with an obstacle, contact with a target due to an operation command to operate exceeding a predetermined position, or the like, feed back the force to the control section of the robot 100, and execute an avoiding action.

By using the robot 100 explained above, it is possible to easily perform an obstacle avoiding action, a target damage avoiding action, and the like, which cannot be dealt with by the position control in the past and perform safe and fine work. Further, it is possible to stably perform highly accurate detection of forces even with a small displacement amount. The invention is not limited to the embodiments and can be applied to a double-arm robot.

The entire disclosure of Japanese Patent Application No. 2012-052623, filed Mar. 9, 2012 is expressly incorporated by reference herein.

What is claimed is:

1. A sensor module comprising:
   a first member including a first recess;
   a sensor element including a piezoelectric body and an electrode, the sensor element being arranged in the first recess of the first member;
   a second member joined to the first member, the second member sealing the first recess of the first member and being in contact with the sensor element;
   a first plate including a first projection unitary therewith, the first projection being in contact with the second member; and
   a second plate that is fastened to the first plate with a fastening section, a fastening force of the fastening section being adjustable,
   wherein a dimension that extends from a contact surface of the first member and the sensor element to a first surface is greater than a dimension that extends from the contact surface to a second surface, the first surface being a surface on which the first member and the second member are joined and the second surface being a surface at which the second member is in contact with the sensor element.

2. The sensor module according to claim 1, wherein a second projection projecting toward the first member and in contact with the first member is provided on the second plate.

3. The sensor module according to claim 2, wherein a second recess that fits with the second projection is formed on a bottom surface of the first member.

4. The sensor module according to claim 1, wherein, around a peripheral section surrounding a portion of the second member in contact with the first projection in plan view in a thickness direction of the second member, the sensor module includes a thin section having thickness less than thickness of the portion in contact with the first projection.

5. The sensor module according to claim 1, wherein, when a laminating direction of a plurality of the piezoelectric bodies laminated in the sensor element is represented as a Z-axis direction and directions orthogonal to the Z-axis direction and orthogonal to each other are respectively represented as an X-axis direction and a Y-axis direction, the sensor module includes at least a first sensor element that detects a force in the X-axis direction, a second sensor element that detects a force in the Y-axis direction, and a third sensor element that detects a force in the Z-axis direction.

6. A force detecting device comprising:
   a first member including a first recess;
   a sensor element including a piezoelectric body and an electrode, the sensor element being arranged in the first recess of the first member;

a second member joined to the first member, the second member sealing the first recess of the first member and being in contact with the sensor element;

a first plate including a first projection unitary therewith, the first projection being in contact with the second member;

a second plate that is fastened to the first plate with a fastening section, a fastening force of the fastening section being adjustable, and an electronic circuit electrically connected to the sensor element, wherein a dimension that extends from a contact surface of the first member and the sensor element to a first surface is greater than a dimension that extends from the contact surface to a second surface, the first surface being a surface on which the first member and the second member are joined and the second surface being a surface at which the second member is in contact with the sensor element.

7. A robot comprising:
a main body section;
an arm section connected to the main body section;
a hand section connected to the arm section; and
a sensor module disposed in a connecting section of the arm section and the hand section, wherein
the sensor module includes:
   a first member including a first recess;
   a sensor element including a piezoelectric body and an electrode, the sensor element being arranged in the first recess of the first member;
   a second member joined to the first member, the second member sealing the first recess of the first member and being in contact with the sensor element;
   a first plate including a first projection unitary therewith, the first projection being in contact with the second member; and
   a second plate that is fastened to the first plate with a fastening section, a fastening force of the fastening section being adjustable, wherein a dimension that extends from a contact surface of the first member and the sensor element to a first surface is greater than a dimension that extends from the contact surface to a second surface, the first surface being a surface on which the first member and the second member are joined and the second surface being a surface at which the second member is in contact with the sensor element.

8. A sensor module comprising:
a first member including a first recess;
a piezoelectric body including an electrode, piezoelectric body including the electrode being arranged in the first recess of the first member;
a second member joined to the first member, the second member sealing the first recess of the first member and being in contact with the piezoelectric body including the electrode;
a first plate including a first projection unitary therewith, the first projection being in contact with the second member; and
a second plate that is fastened to the first plate with a fastening section, a fastening force of the fastening section being adjustable, wherein a dimension that extends from a contact surface of the first member and the piezoelectric body including the electrode to a first surface is greater than a dimension that extends from the contact surface to a second surface, the first surface being a surface on which the first member and the second member are joined and the second surface being a surface at which the second member is in contact with the piezoelectric body including the electrode.

* * * * *